United States Patent Office 3,164,570
Patented Jan. 5, 1965

3,164,570
DYEABLE LINEAR POLYESTERS MODIFIED BY A METALLOSULFOFLUORENYL-SUBSTITUTED ALKANOIC ACID OR ESTER
Christian F. Horn, South Charleston, W. Va., assignor to Union Carbide Corporation, a corporation of New York
No Drawing. Filed Nov. 1, 1961, Ser. No. 149,204
19 Claims. (Cl. 260—75)

This invention relates to new condensation polymers. The invention also relates to textile article, i.e. fibers, filaments, yarns, etc., as well as to films and other structures of said polymers which have an improved affinity for dyestuffs.

Synthetic linear polyesters are well known to the art and are readily prepared, for example, by the reaction of dibasic carboxylic acids, or their ester-forming deriavtives, with dihydric alcohols, or their functional derivatives. The high-molecular weight linear polyester thus obtained find frequent use in the production of textile articles, films, and the like. Of particular interest in this regard are the polyesters of terephthalic acid and its esters with glycols, such as polyethylene terephthalate, and the polyester from dimethyl terephthalate and 1,4-cyclohexanedimethanol, etc. Unfortunately, the filamentous products produced from these polyesters have little affinity for dyestuffs by conventional dyeing procedures, and consequently, their utility in the fabric field is somewhat restricted.

It was to be expected that many efforts would be made to improve the dyeability of a film-, and filament-forming material having as many desirable characteristics as those possessed by polyethylene terephthalate. Such efforts have indeed been made. However, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols, thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols, and the like, for the dyeing process. Still another involved the application of vat or acetate dyes under superatmospheric pressure at temperatures above 100° C. Another required the use of fiber-swelling agents or dye carriers. Still another involved the use of pigments that are mixed directly with the polyethylene terephthalate melt before spinning.

It is apparent that these efforts have at best had very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without impairing the characteristics of the polyester. Thus, for example, polyethylene terephthalate fibers and films made in accordance with the method of this invention as hereinbelow described are readily dyeable by ordinary dyeing techniques, while at the same time retaining excellent heat and light stability, dimensional stability and other desirable physical properties.

The dyeable linear polyesters of this invention are prepared essentially from an aromatic dicarboxylic acid or ester forming derivative thereof, with a diol, such as an acyclic or alicyclic aliphatic glycol, an aliphatic-aromatic diol, an aromatic diol, or a diester thereof, and a small amount of a mono-, or di-(metallosulfo)fluorenealkanoic acid or ester represented by the generic formula:

(I)
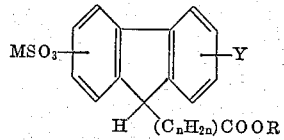
H (C$_n$H$_{2n}$)COOR wherein Y designates a hydrogen atom or a metallosulfo (—SO$_3$M) radical; M designates an alkali metal atom, as for instance, a lithium, sodium, potassium, rubidium or cesium atom, etc., and preferably designates an alkali metal atom having an atomic number of from 3 to 19, i.e., a lithium, sodium, or potassium atom; n designates an integer having a value of from 1 to about 12, and preferably from 2 to about 8; and R designates a hydrogen atom or an alkyl radical preferably containing from 1 to about 8 carbon atoms, such as a methyl, ethyl, propyl, butyl, hexyl, octyl, or 2-ethylhexyl radical, of which the lower alkyl radicals containing from 1 to about 4 carbon atoms are more preferred.

Thus, by way of further illustration, the monometallosulfofluorenealkanoic acids and esters used to prepare dyeable linear polyesters in accordance with this invention can be represented by the sub-generic formula:

(II)
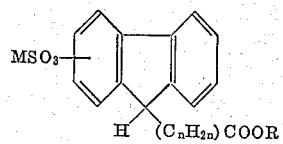
H (C$_n$H$_{2n}$)COOR wherein M, n, and R are as defined above. As typical of such compounds, there can be mentioned:

2-(sodiumsulfo)fluorene-9-acetic acid
2-(lithiumsulfo)fluorene-9-propionic acid
2-(potassiumsulfo)fluorene-9-butyric acid
2-(sodiumsulfo)fluorene-9-pentanoic acid
2-(lithiumsulfo)fluorene-9-hexanoic acid
2-(potassiumsulfo)fluorene-9-heptanoic acid
2-(sodiumsulfo)fluorene-9-octanoic acid
Alpha-ethyl-2-(lithiumsulfo)fluorene-9-hexanoic acid
2-(potassiumsulfo)fluorene-9-dodecanoic acid
4-(sodiumsulfo)fluorene-9-acetic acid
Methyl 2-(sodiumsulfo)fluorene-9-acetate
Octyl 2-(lithiumsulfo)fluorene-9-propionate
2-ethylhexyl 2-(potassiumsulfo)fluorene-9-butyrate
Butyl 2-(sodiumsulfo)fluorene-9-pentanoate
Propyl 2-(lithiumsulfo)fluorene-9-hexanoate
Ethyl 2-(potassiumsulfo)fluorene-9-heptanoate
Methyl 2-(sodiumsulfo)fluorene-9-octanoate
Methyl alpha-ethyl-2-(lithiumsulfo)fluorene-9-hexanoate
Methyl 2-(potassiumsulfo)fluorene-9-dodecanoate
Methyl 4-(sodiumsulfo)fluorene-9-acetate, and the like Similarly, the di(metallosulfo)fluorenealkanoic acids and esters used to prepare dyeable linear polyesters in accordance with this invention can be represented by the sub-generic formula:

III
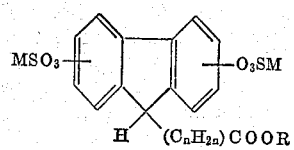
H (C$_n$H$_{2n}$)COOR wherein M, n, and R are as defined above. As typical of such compounds, there can be mentioned:

2,7-di(sodiumsulfo)fluorene-9-acetic acid
2,7-di(lithiumsulfo)fluorene-9-propionic acid
2,7-di(potassiumsulfo)fluorene-9-butyric acid
2,7-di(sodiumsulfo)fluorene-9-pentanoic acid
2,7-di(lithiumsulfo)fluorene-9-hexanoic acid
2,7-di(potassiumsulfo)fluorene-9-heptanoic acid
2,7-di(sodiumsulfo)fluorene-9-octanoic acid
Alpha-ethyl-2,7-di(lithiumsulfo)fluorene-9-hexanoic acid
2,7-di(potassiumsulfo)fluorene-9-dodecanoic acid
4,5-di(sodiumsulfo)fluorene-9-acetic acid
Methyl 2,7-di(sodiumsulfo)fluorene-9-acetate
Octyl 2,7-di(lithiumsulfo)fluorene-9-propionate
2-ethylhexyl 2,7-di(potassiumsulfo)fluorene-9-butyrate
Butyl 2,7-di(sodiumsulfo)fluorene-9-pentanoate
Propyl 2,7-di(lithiumsulfo)fluorene-9-hexanoate
Ethyl 2,7-di(potassiumsulfo)fluorene-9-heptanoate
Methyl 2,7-di(sodiumsulfo)fluorene-9-octanoate
Methyl alpha-ethyl-2,7-di(lithiumsulfo)fluorene-9-hexanoate
Methyl 2,7-di(potassiumsulfo)-9-dodecanoate
Methyl 4,5-di(sodiumsulfo)fluorene-9-acetate, and the like The mono-, and di(metallosulfo)fluorenealkanoic acids and esters contemplated by this invention can be produced by steps which include the sulfonation of a member of a known class of compounds, viz., the 9-fluorenealkanoic acids and alkyl esters thereof represented by the formula:

(IV)

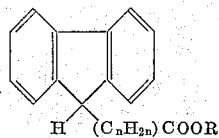

wherein n and R are as defined above. As typical of such known compounds, there can be mentioned:

9-fluoreneacetic acid
9-fluorenepropionic acid
9-fluorenebutyric acid
9-fluorenepentanoic acid
9-fluorenehexanoic acid
9-fluoreneoctanoic acid
Alpha-ethyl-9-fluorenehexanoic acid
9-fluorenedodecanoic acid
Methyl 9-fluoreneacetate
Octyl 9-fluorenepropionate
2-ethylhexyl 9-fluorenebutyrate
Butyl 9-fluorenepentanoate
Propyl 9-fluorenehexanoate
Ethyl 9-fluoreneheptanoate
Methyl 9-fluoreneoctanoate
Methyl alpha-ethyl-9-fluorenehexanoate
Methyl 9-fluorenedodecanoate, and the like The 9-fluorenealkanoic acids can initially be obtained, for example, by reacting fluorene with either a lactone represented by the formula:

(V)

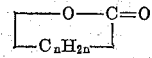

or with a hydroxy acid represented by the formula:
(VI)     $HOC_nH_{2n}COOH$ wherein n is as defined above. The reaction is carried out by bringing the reactants into reactive admixture in a mole ratio of up to about 1 mole of the lactone or hydroxy acid per mole of fluorene, at a temperature of from about 150° C. to about 350° C. In addition, the presence of a strong base is desirable in order to promote the reaction, and to this end, an alkali metal hydroxide is generally also incorporated in the reaction mixture in a mole ratio of at least 1 mole of base per mole of the lactone or hydroxy acid. The 9-fluorenealkanoic acid thus produced is readily recovered as the alkali metal salt, from which the corresponding free acid can be obtained by conventional acidification. The free acid, in turn, is readily converted to the corresponding alkyl ester by esterification in conventional manner with an alkyl alcohol containing from 1 to about 8, and preferably from 1 to about 4 carbon atoms, such as methanol, ethanol, propanol, butanol, hexanol, octanol, 2-ethylhexanol, and the like.

The conversion of the 9-fluorenealkanoic acid or ester to the sulfonic acid derivative represented by the formula:

(VII)

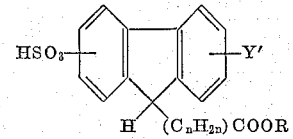

wherein Y' designates a hydrogen atom or a sulfo (—$SO_3H$) radical, and n and R are as defined above, can be carried out by known sulfonation procedures. Thus, for example, the 9-fluorenealkanoic acid or ester can be sulfonated by reaction with a mild sulfonating agent comprised of a mixture of sulfuric acid and acetic anhydride, at a temperature of from about −15° C. to about 50° C., and preferably from about 0° C. to about 25° C. The 9-fluorenealkanoic acid or ester, of which the latter is preferably employed, is best introduced to the sulfonating agent in solution, using, by way of illustration, an inert solvent, such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the 9-fluorenealkanoic acid or ester can vary from about 0.5 to about 5 moles of sulfuric acid per mole of the 9-fluorenealkanoic acid or ester, with a ratio of from about 0.8 to about 1.5 moles of sulfuric acid per mole of the 9-fluorenealkanoic acid or ester being preferred.

The sulfonated product obtained in this manner is predominantly the monosulfo derivative. When the disulfo derivative is desired, the 9-fluorenealkanoic acid or ester can be sulfonated by reaction with concentrated sulfuric acid. At temperatures up to about 60° C. monosulfonation predominates, and yields of up to about 80 per cent or better of the monosulfo derivative may be obtained. At temperatures above about 60° C., and preferably from about 90° C. to about 110° C., disulfonation occurs to a significant extent. In both instances, however, small yields of other sulfonic acid derivatives are also often produced, and varying the temperature employed results in varying the ratio of monosulfo and disulfo derivatives formed.

When employing concentrated sulfuric acid as the sole sulfonating agent, the mole ratio of concentrated sulfuric acid to the 9-fluorenealkanoic acid or ester can vary from about 1 to about 6 moles of concentrated sulfuric acid per mole of the 9-fluorenealkanoic acid or ester. Lower mole ratios within this range favor the formation of the monosulfo derivative, and a ratio of from about 1 to about 3 moles of concentrated sulfuric acid per mole of the 9-fluorenealkanoic acid or ester is preferred in order to obtain high yields of the monosulfo derivative in the sulfonation reaction. Higher mole ratios favor the formation of the disulfo derivative, and a ratio of from about 3 to about 5 moles of concentrated sulfuric acid per mole of the 9-fluorenealkanoic acid or ester is preferred in order to obtain high yields of the disulfo derivative in the sulfonation reaction. Advantageously, a sulfonation catalyst, such as mercury, mercuric sulfate, vanadium pentoxide, or the like, can also be used in the reaction, but its presence is not essential.

Produced as hereinabove described, the sulfonated 9-fluorenealkanoic acid or ester can be recovered, if desired, in any convenient manner, such as by crystallization and filtration, etc. Moreover, while the 2-sulfofluorene and 2,7-disulfofluorene derivatives are most readily produced, other sulfofluorene derivatives are also often formed, or can be obtained by varying the sulfonation reaction in a manner determinable by those skilled in the art in light of this disclosure.

When the starting material used in the sulfonation is the free acid, that is when R of Formula IV is hydrogen, the sulfonated product is readily converted to the corresponding alkyl carboxylate ester by esterification in conventional manner with an alkyl alcohol containing from 1 to about 8, and preferably from 1 to about 4 carbon atoms. The presence of the sulfo radicals(s) during the esterification serves to catalyze the reaction (autocatalysis), thus obviating the conventional addition of an esterification catalyst.

The sulfonated 9-fluorenealkanoic acid or ester is thereafter reacted with an alkali metal hydroxide or alkoxide, or an alkali metal salt of an acid weaker than sulfonic acid, such as acetic acid or benzoic acid, etc., to form the corresponding alkali metal sulfonate salt, i.e., metallosulfo derivative. Preferably, such a reaction is carried out in an alcoholic or aqueous solution, and at a temperature of from about 5° C. to about 110° C., and preferably from about 20° C. to about 80° C.

The mole ratio of alkali metal hydroxide, alkoxide, or salt to the sulfonated 9-fluorenealkanoic acid or ester can vary from about 1 to about 10 moles of the alkali metal-containing compound per mole of the sulfonated 9-fluorenealkanoic acid ester, with a ratio of from about 1 to about 3 moles of the alkali metal-containing compound per mole of the sulfonated 9-fluorenealkanoic acid or ester being preferred. Moreover when the sulfonated product undergoing reaction is the alkanoate ester, the conversion of the product to the alkali metal sulfonate derivative can be effected conveniently by titration with an alkali metal hydroxide or alkoxide, preferably in alcoholic solution, to a pH of 7 to 8.

The alkali metal sulfonate thus produced can subsequently be recovered in any convenient manner, such as by filtration, or as the residue product obtained upon evaporation of any solvent present, etc., and thereafter employed to prepare dyeable linear polyesters in accordance with this invention, as hereinbelow described. For convenience, the metallosulfofluorenealkanoic acids and esters thus produced will hereinafter be referred to as the monofunctional dye-assistants of this invention.

Particularly suitable diols for use in preparing the dyeable linear polyesters of this invention are the acyclic and alicyclic aliphatic glycols containing from 2 to 10 carbon atoms, especially those represented by the general formula $HO(CH_2)_mOH$ wherein $m$ is an integer of from 2 to 10, such as ethylene glycol, trimethylene glycol, pentamethylene glycol, hexamethylene glycol, decamethylene glycol, and the like. Other suitable aliphatic glycols include 1,4-cyclohexanedimethanol, p-xylene glycol, and the like. It is known that any glycol of an aliphatic nature, whether or not it contains aromatic nuclei, can be used in the production of linear polyesters. Thus, the term aliphatic glycol as employed herein includes all those glycols of acyclic and alicyclic aliphatic nature which are known to the art to be suitable. Still other suitable diols include aliphatic-aromatic diols such as 4-hydroxybenzyl alcohol, aromatic diols such as hydroquinone, etc. Mixtures of two or more diols can also be employed, with up to about 10 mole per cent or slightly more of any one diol being replaced by a different diol.

Particularly suitable aromatic dicarboxylic acid compounds for use in preparing the dyeable linear polyesters of this invention are the monocyclic aromatic dicarboxylic acids and the dialkyl esters thereof preferably containing from 1 to about 8 carbon atoms in each alkyl ester radical, especially terephthalic acid and the dialkyl esters thereof, such as dimethyl terephthalate and similar esters in which the alkyl ester radicals more preferably contain from 1 to about 4 carbon atoms. Other suitable aromatic dicarboxylic acids or esters include:

isophthalic acid,
p,p'-Diphenylcarboxylic acid,
p,p'-Dicarboxydiphenyl ethane,
p,p'-Dicarboxydiphenyl hexane,
p,p'-Dicarboxydiphenyl sulfide,
p,p'-Dicarboxydiphenyl sulfone,
p,p'-Dicarboxydiphenyl ether,
p,p'-Dicarboxyphenoxy ethane,
2,6-naphthalene dicarboxylic acid; their alkyl esters; and the like.

Mixtures of two or more dicarboxylic acids or esters can also be used, with up to about 10 mole percent or slightly more of any one aromatic dicarboxylic acid or ester being replaced by a different aromatic dicarboxylic acid or ester, or by an aliphatic dicarboxylic acid or ester, such as adipic acid, succinic acid, sebacic acid, dimethyl sebacate, dimethyl 1,2-eicosane dioate, and the like.

Dyeable linear polyesters can also be prepared by the self-condensation of a hydroxycarboxylic acid or ester together with a monofunctional dye-assistant of this invention, or by the partial replacement of a diol or aromatic dicarboxylic acid or ester with a hydroxycarboxylic acid or ester within the limits hereinabove described.

In preparing the dyeable linear polyesters of this invention, at least about a 1.3 to 1 molar ratio of diol to dicarboxylic acid or ester is used. However, an excess of diol to the dicarboxylic acid compound ranging from about 2 to 10 moles of diol per mole of the dicarboxylic acid compound can also be used. A more satisfactory ratio is from about 1.3 to about 7 moles of diol per mole of the dicarboxylic acid compound, with a ratio of from about 1.5 to about 5 moles of diol per mole of the dicarboxylic acid compound being especially preferred.

The amount of monofunctional dye-assistant employed in preparing the dyeable linear polyesters of this invention can be varied from about 0.1 to about 3.5 mole percent of the dye-assistant based upon the total amount of dicarboxylic acid compound charged, i.e., as the free acid or as the ester. A preferred ratio is from about 0.15 to about 2.5 mole percent of the dye-assistant based upon the total amount of dicarboxylic acid compound present. While somewhat greater amounts of the dye-assistant can also be employed, the use of a proportion greater than about 5 mole percent of one or more of the dye-assistants based upon the total amount of dicarboxylic acid compound charged may have an undesirable effect upon the molecular weight of the polyester product.

Moreover, in the formation of a dyeable linear polyester by the reaction of any one given dicarboxylic acid or ester with any one given diol, especially good results, measurable in terms of improved dyeability, can be obtained in accordance with this invention when from about 0.1 to about 5 mole percent of either the dicarboxylic acid compound or the diol is replaced by one or more different comonomers of similar difunctionality. The comonomer can be any of the dicarboxylic acids or esters, diols or hydroxy-carboxylic acids or esters hereinabove described, other than the difunctional monomers conventionally employed in producing a given polyester, as indicated above. The presence of the comonomer, it is believed, disrupts the crystallinity of the polyester product to a limited extent, thereby making the dye-attractive metallosulfo radicals of the dye-assistant more accessible to dye molecules during subsequent dyeing operations. Higher proportions of comonomer within the ranges hereinabove described can also be employed, although such use is generally attended by little additional advantage insofar as improved dyeability is concerned.

However, as is known to the art, the comonomer can, by appropriate selection, also serve as a dye-assistant, thereby further enhancing the dyeability of the linear polyesters of this invention. As illustrative of the difunctional comonomers which can also serve as a dye-assistant, there can be mentioned the mono-, and di(metallosulfo)fluorenedialkanoic acids and esters represented by the generic formula:

(VIII)

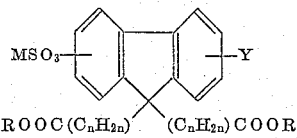

ROOC(C$_n$H$_{2n}$)  (C$_n$H$_{2n}$)COOR wherein Y, M, n and R are as defined above in connection with Formula I. As typical thereof, there can be mentioned:

2-(sodiumsulfo)fluorene-9,9-diacetic acid
2-(potassiumsulfo)fluorene-9,9-dipropionic acid
2-(lithiumsulfo)fluorene-9,9-dihexanoic acid
2-(sodiumsulfo)fluorene-9,9-dioctanoic acid
2,7-di(potassiumsulfo)fluorene-9,9-dipropionic acid
Dioctyl 2-(sodiumsulfo)fluorene-9,9-diacetate
Dibutyl 2-(potassiumsulfo)fluorene-9,9-dipropionate
Diethyl 2-(lithiumsulfo)fluorene-9,9-dihexanoate
Dimethyl 2-(sodiumsulfo)fluorene-9,9-dioctanoate
Dimethyl 2,7-di(potassiumsulfo)fluorene-9,9-dipropionate, and the like Such compounds can be produced by reactions similar to those described above in connection with the production of the mono-functional dye-assistants of this invention, employing as starting material, a 9,9-fluorenedialkanoic acid or ester represented by the formula:

(IX)

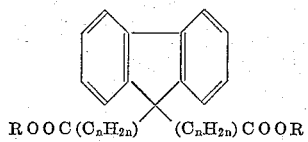

ROOC(C$_n$H$_{2n}$)  (C$_n$H$_{2n}$)COOR wherein n and R are as defined above. Other difunctional comonomers which can serve as a dye-assistant will also occur to those skilled in the art in light of this disclosure, and can be employed in accordance with this invention.

In the practice of this invention, the prescribed amounts of dicarboxylic acid or ester, diol, monofunctional dye-assistant, and catalyst, when desired, are charged to a reactor. When a dicarboxylic acid ester is employed as a reactant, the reaction mixture is heated at a temperature of from about 150° C. to about 270° C., and preferably from about 170° C. to about 260° C., in an inert atmosphere to effect an initial ester interchange reaction. Alternatively, an initial direct esterification can be carried out by employing the free dicarboxylic acid instead of the ester as a reactant. Thereafter, any excess glycol is removed by heating the reaction mixture to a temperature of up to about 300° C., under reduced presusre in an inert atmosphere, or by passing a stream of an inert gas through the reaction mixture at atmospheric pressure. A polycondensation is then carried out by heating the reaction mixture at a temperature of from about 225° C. to about 325° C., and preferably from about 250° C. to about 290° C., under a reduced pressure of from about 0.1 mm. to about 5 mm. of mercury, in an inert atmosphere. If desired, the entire reaction can be carried out at atmospheric pressure while bubbling a stream of inert gas through the reaction mixture, the rate of gas flow being increased as the polycondensation proceeds. The total reaction period can be from about one to twelve hours, according to the catalyst employed and its concentration, the temperature, the pressure, the starting monomers, the viscosity desired for the polyester product, etc., as is known in the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanate, calcium titanium silicate, and the like. Other conventional catalysts can also be employed. The concentration of the catalyst can be varied from about 0.001 to about 1 percent by weight, based upon the total amount of dicarboxylic acid compound charged. A preferred amount is from about 0.005 to about 0.5 percent by weight of catalyst, and more preferably from about 0.01 to about 0.2 percent by weight of catalyst, based upon the total amount of dicarboxylic acid compound charged. Other materials can also also be included in the reaction mixture, as for example, color inhibitors such as alkyl or aryl phosphites; pigments, delusterants or other additives, such as titanium dioxide or barium carbonate; or viscosity stabilizers, etc.

A typical procedure for producing the polyesters is described, for example, in U.S. 2,465,319, although this procedure can be varied by one skilled in the art in light of this disclosure.

That the monofunctional dye-assistants of this invention could be employed in the production of high-melting, crystalline, linear polyesters was surprising and unexpected since fluorene, the basic structure of the dye-assistants, ordinarily discolors and/or decomposes when heated to the temperatures employed in making the polyesters. Thus, it was unexpected that the dye-assistants would be sufficiently stable, both chemically and thermally, to withstand the polycondensation conditions in the presence of the other reactants, as well as the high temperatures necessary for spinning the polyesters. It was also surprising that the fibers produced from these polyesters showed no disadvantages in physical properties over the unmodified polyester fibers, and that they exhibited greatly enhanced dyeability, as well as many other desirable textile properties. By way of illustration, such fibers are also often desirably delustered or "whitened," and upon dyeing with basic or disperse dyestuffs by standard procedures, possess medium to deep shades of color having good wash fastness and light fastness, as well as stability to conventional dry-cleaning operations. Fabrics produced from the fibers are also characterized by a desirable "hand," and "wash-and-wear" properties.

At the same time, the monofunctional dye-assistants advantageously also serve as chain-terminators in the polycondensation reaction producing the polyesters, thereby affording effective and convenient control over the molecular weight of the polyester products while simultaneously improving the dyeability of the polyester. The dye-assistants are, in fact, particularly well suited for use as molecular weight regulators in a continuous polycondensation process due to their extremely low volatility. Thus, the compounds are not readily removed from the reaction mixture by either vacuum or contact with inert gas which may be passed through the reaction mixture during the polycondensation. Moreover, since the dye-assistants occur in the resulting polyesters only at the end of linear chains, due to their monofunctional structure, they do not materially effect the desirable physical properties of the polyesters. Hence, the proportion in which the dye-assistants are employed or incorporated in accordance with this invention to prepare polyesters having improved dyeability, i.e. from about 1 to about 3.5 mole percent based upon the total carboxylate content of the polyesters, is ordinarily much less than that in which difunctional dye-assistants, which interrupt the polymer chain, are conventionally employed.

The specific examples which follow serve as further illustration of the present invention. In the examples, the reduced viscosity (I$_R$) of the dyeable linear polyesters of this invention was determined by dividing the specific viscosity of a solution of the polyester by the concentration of the polyester in the solution. The specific viscosity was determined by dividing the difference between the viscosity of the polyester solution and the viscosity of the solvent by the viscosity of the solvent. In particular, the reduced viscosity of the polyesters was calculated from the equation:

$$(IX) \qquad I_R = \frac{\Delta N}{N_0} \times \frac{1}{C}$$

wherein $\Delta N$ is the difference between the flow time of the polyester solution and the flow time of solvent, $N_0$ is the flow time of the solvent, and $C$ is the concentration of the polyester in grams per 100 milliliters of solution. The reduced viscosities were obtained at a polyester concentration of 0.2 gram per 100 milliliters of solution, using a 3:2 mixture of phenol and tetrachloroethane as the solvent. The reduced viscosity of the polyesters can vary from about 0.2 to about 3, with values from about 0.35 to about 1 being preferred.

The dyeable linear polyesters of this invention were melt-spun to form filaments and yarns. Before melt-spinning, the polyesters were dried overnight at a temperature of 90° C. under a reduced pressure of 2 mm. of mercury, and then melt extruded in a plunger-type spinning machine at a temperature of from 270° C. to 295° C., using a spinnerette having 30 holes, each 0.015 inch in diameter. The orifice velocity was 3 feet per minute and the yarn was taken up at 150 feet per minute, a draw ratio of 50:1. The yarn was hot-stretched at a temperature of 90° C. around an electrically heated pin to an extent of from 200 to 500 percent, and then continuously annealed at a temperature of 150° C. over an electrically heated bar, allowing 10 percent relaxation. The yarn was thereafter woven into fabrics and dyed. The spinning procedure used is conventional for polyesters, and is well known to the art.

The fabrics were dyed by standard procedures both in the absence of, and using dye-carriers. The dye baths used had a liquor-to-fiber bath ratio of 40:1 and, based upon the weight of the fabric to be dyed, contained 1 percent by weight of nonyl phenyl polyethylene glycol ether in the case of a basic dyebath, and 1 percent by weight of sodium N-methyl-N-oleoyltaurate in the case of a disperse dyebath. The dye concentration was 3 percent by weight based upon the weight of the fabric.

In a typical dyeing procedure, the various components of the dyebath were admixed and made up to volume with distilled water. The dyestuff was introduced as a paste in 0.25 percent by weight of acetic acid, based upon the weight of the fabric to be dyed. The fabric was scoured in a commercially available washer and dried in a commercially available drier. About 5 to 10 grams of the fabric was added to the dyebath, and the temperature of the bath was raised to the boil over a period of 15 minutes, and held at the boil for an additional period of 90 minutes. The dyed fabric was then rinsed in warm water and scoured in an aqueous solution containing 1 percent by weight of a commercially available alkyl phenyl polyethylene glycol ether surfactant and 0.25 percent by weight of soda ash, based upon the weight of the fabric, at a temperature of 60° C. for a period of 15 minutes. The dyed and scoured fabric was finally rinsed in water and air dried.

Among the basic and disperse dyestuffs which readily dye the fibers produced from the polyesters of this invention, one can mention the "Genacryl" dyes discussed on pages 432 to 433 of the Americal Dyestuff Reporter, volume 43, 1954, for example, Genacryl Red 6B (Basic Violet 7, Color Index No. 48020); Genacryl Pink G (Basic Blue 1, Color Index No. 42025); Celliton Fast Red GGA Ex. Conc. (Disperse Red 17, Color Index No. 11210); Fuchsine SPC (Basic Red 9, Color Index No. 42500); Fuchsine Conc. (Basic Violet 14, Color Index No. 42510); Methyl Violet 2B (Basic Violet 1, Color Index No. 42535); Methylene Blue SP (Basic Blue 9, Color Index No. 52015); Victoria Green (Basic Green 4, Color Index No. 4200); Rhodamine B (Basic Violet 10, Color Index No. 45170); Sevron Yellow R (Basic Yellow 11, Color Index No. 48055); Celliton Fast Pink BA (Disperse Red 15, Color Index 60710); Latyl Blue FL; Maxilon Red BL; Severon Brillian Red 4G (Basic Red 14); Sevron Blue 5G (Basic Blue, Color Index 51004); and the like.

EXAMPLE I

A mixture of 175 grams of dimethyl terephthalate, 4.86 grams of methyl 2-(sodiumsulfo)fluorene-9-propionate, 180 grams of ethylene glycol, 0.018 gram of antimony oxide, and 0.081 gram of zinc acetate was charged to a reactor and heated at a temperature of from 175° C. to 183° C. for a period of 3.5 hours to carry out an ester exchange, while distilling the methanol formed during the reaction. The reaction mixture was then heated at a temperature of from 228° C. to 230° C. for a period of 2 hours to remove the glycol excess. Thereafter, the temperature of the reaction mixture was maintained in the range of from 258° C. to 265° C. for a period of 7.5 hours to carry out a polycondensation. During the reaction, a vigorous stream of nitrogen was passed through the reaction mixture at atmospheric pressure. A crystalline polyester was thereby obtained, having a reduced viscosity of 0.50 and a melting point of 258–260° C. The polyester possessed excellent dyeable fiber-forming and cold-drawing properties.

EXAMPLE II

A mixture of 175 grams of dimethyl terephthalate, 6.08 grams of methyl 2-(sodiumsulfo)fluorene-9-butyrate, 180 grams of ethylene glycol, 0.180 gram of antimony oxide, and 0.081 gram of zinc acetate was charged to a reactor and heated at a temperature of from 185° C. to 187° C. for a period of 3.5 hours to bring about an ester exchange, while distilling the methanol formed during the reaction. The reaction mixture was then heated at a temperature of from 228° C. to 230° C. for a period of 1.75 hours to remove the glycol excess. Thereafter, the temperature of the reaction mixture was maintained in the range of from 268° C. to 275° C. for a period of 7.5 hours to carry out a polycondensation. During the reaction, a vigorous stream of nitrogen was passed through the reaction mixture at atmospheric pressure. A white, crystalline polyester was thus obtained, having a reduced viscosity of 0.45 and a melting point of 258–260° C. The polyester possessed excellent dyeable fiber-forming and cold-drawing properties.

EXAMPLE III

A mixture of 175 grams of dimethyl terephthalate, 5.15 grams of methyl 2-(sodiumsulfo)fluorene-9-butyrate, 3.62 grams of dimethyl isophthalate, 180 grams of ethylene glycol, 0.018 gram of antimony oxide, and 0.083 gram of zinc acetate was charged to a reactor and heated at a temperature of from 185° C. to 188° C. for a period of 4 hours to bring about an ester exchange, while distilling the methanol formed during the reaction. The reaction mixture was then heated at a temperature of from 268° C. to 272° C. for a period of 3 hours to remove the glycol excess. Thereafter, the temperature of the reaction mixture was maintained in the range of from 265° C. to 268° C. for a period of 6.5 hours to carry out a polycondensation. During the reaction, a vigorous stream of nitrogen was passed through the reaction mixture at atmospheric pressure. A white, crystalline polyester was thus obtained, having a reduced viscosity of 0.51 and a melting point of 248–251° C. The polyester was characterized by excellent dyeable fiber-forming and cold-drawing properties. Fibers melt-spun from this polyester were dyed to a medium shade with Genacryl Pink G and to a deep shade with Celliton Fast Red GGA Ex. Conc. without the use of a carrier. Similarly dyeable fibers are also obtained from the polyester prepared as described above in this example, employing butyl 2-(potassiumsulfo)fluorene-9-acetate as the monofunctional dye-assistant of this invention. By way of comparison, fibers melt-spun from a polyester condensation product of ethylene glycol with 90 mole percent of terephthalic acid and 10 mole percent of isoterephthalic acid, i.e. excluding the monofunctional dye-assistant of this invention, were not dyed by Genacryl Pink G, and were dyed to only a very light shade with Celliton Fast Red GGA Ex. Conc.

EXAMPLE IV

A mixture of 170 grams of dimethyl terephthalate, 5.53 grams of methyl 2-(sodiumsulfo)fluorene-9-hexanoate, 120 grams of ethylene glycol, 0.053 gram of antimony oxide, and 0.079 gram of zinc acetate was charged to a reactor and heated at a temperature of 185° C. for a period of 3.5 hours to bring about an ester exchange, while distilling the methanol formed during the reaction. The reaction mixture was then heated at a temperature of 265° C. for a period of 2 hours to remove the glycol excess. Thereafter, the temperature of the reaction mixture was maintained at 265° C.; under a reduced pressure of 2 mm. of mercury for a period of 6.25 hours to carry out a polycondensation. During the reaction a stream of nitrogen was passed through the reaction mixture. A white, crystalline polyester was thus obtained, having a reduced viscosity of 0.44 and a melting point of 250–253° C. The polyester was characterized by excellent dyeable fiber-forming and cold-drawing properties. Fibers melt-spun from this polyester were dyed to a medium shade with Genacryl Pink G and to a medium shade with Celliton Fast Red GGA Ex. Conc. without the use of a carrier. Similarly dyeable fibers are also obtained from the polyester prepared as described above in this example, employing ethyl 2-(lithiumsulfo)fluorene-9-butyrate as the monofunctional dye-assistant of this invention. By way of comparison, fibers melt-spun from a polyethylene terephthalate polyester, i.e. excluding the monofunctional dye-assistant of this invention, were not dyed by Genacryl Pink G, and were dyed to only a very light shade with Celliton Fast Red GGA Ex. Conc.

EXAMPLE V

A mixture of 194 grams of dimethyl terephthalate, 6.84 grams of methyl 2-(sodiumsulfo)fluorene-9-hexanoate, 180 grams of ethylene glycol, 0.02 gram of antimony oxide, and 0.09 gram of zinc acetate was charged to a reactor and heated at a temperature of 185° C. for a period of 4.5 hours to bring about an ester exchange, while distilling the methanol formed during the reaction. The reaction mixture was then heated at a temperature of from 220° C. for a period of 2.5 hours to remove the glycol excess. Thereafter, the temperature of the reaction mixture was maintained at 265° C. for a period of 5.25 hours to carry out a polycondensation. During the reaction, a vigorous stream of nitrogen was passed through the reaction mixture at atmospheric pressure. A white, crystalline polyester was thus obtained, having a reduced viscosity of 0.47 and a melting point of 257–259° C. The polyester was characterized by excellent dyeable fiber-forming and cold-drawing properties. Fibers melt-spun from this polyester were dyed to a medium shade with Genacryl Pink G and to a deep shade with Celliton Fast Red GGA Ex. Conc. without the use of a carrier. Similarly dyeable fibers are also obtained from the polyester prepared as described above in this example, employing methyl 2-(potassiumsulfo)fluorene-9-octanoate as the monofunctional dye-assistant of this invention.

EXAMPLE VI

A mixture of 194 grams of dimethyl terephthalate, 5.05 grams of methyl 2-(sodiumsulfo)fluorene-9-hexanoate, 3.46 grams of dimethyl 2-(potassiumsulfo)fluorene-9,9-dipropionate, 180 grams of ethylene glycol, 0.02 gram of antimony oxide, and 0.09 gram of zinc acetate was charged to a reactor and heated at a temperature of from 185° C. to 190° C. for a period of 4.5 hours to bring about an ester exchange, while distilling the methanol formed during the reaction. The reaction mixture was then heated at a temperature of from 220° C. to 260° C. for a period of 3 hours to remove the glycol excess. Thereafter, the temperature of the reaction mixture was maintained at 265° C. for a period of 6 hours to carry out a polycondensation. During the reaction, a vigorous stream of nitrogen was passed through the reaction mixture at atmospheric pressure. A white, crystalline polyester was thus obtained, having a reduced viscosity of 0.39 and a melting point of 256–258° C. The polyester was characterized by excellent dyeable fiber-forming and cold-drawing properties. This example illustrates the use of a difunctional comonomer which is also a dye-assistant.

EXAMPLE VII

A mixture of 30 grams of dimethyl terephthalate, 2.31 grams of methyl 2-(sodiumsulfo)fluorene-9-butyrate, 26.3 grams of ethylene glycol, and 0.15 gram of zinc acetate was charged to a reactor and heated at a temperature of from 182° to 194° C. for a period of 2 hours to bring about an ester exchange, while distilling the methanol formed during the reaction. The reaction mixture was then heated at a temperature of from 205° C. to 220° C. for a period of 0.75 hour to remove the glycol excess. Thereafter, the temperature of the reaction mixture was maintained in the range of from 267° C. to 275° C. for a period of 7.5 hours to carry out a polycondensation. During the reaction, a vigorous stream of nitrogen was passed through the reaction mixture at atmospheric pressure. A crystalline polyester was thus obtained, having a reduced viscosity of 0.40 and a melting point of 232–234° C. Dyeable white fibers melt-spun from this polyester were tough and pliable, and exhibited a cold draw of about 300 percent.

EXAMPLE VIII

A mixture of 155 grams of dimethyl terephthalate, 9.9 grams of dimethyl sebacate, 6.12 grams of methyl 2-(sodiumsulfo)fluorene-9-hexanoate, 133 grams of ethylene glycol, 0.0747 gram of zinc acetate, and 0.0249 gram of antimony oxide was charged to a reactor and heated at a temperature of from 209° C. to 211° C. for a period of 3 hours to bring about an ester exchange, while distilling the methanol formed during the reaction. The reaction mixture was then heated at a temperature of from 234° C. to 235° C. for a period of 1.33 hours to remove the glycol excess. Thereafter, the temperature of the reaction mixture was maintained in the range of from 265° C. to 275° C. for a period of 5 hours to carry out a polycondensation. During the reaction, a vigorous stream of nitrogen was passed through the reaction mixture at atmospheric pressure. A crystalline polyester was thus obtained, having a reduced viscosity of 0.51 and a melting point of 232–233° C. Dyeable white fibers melt-spun from this polyester were tought and pliable, and exhibited a cold-draw of between 450 and 500 percent. The fibers were dyed to a medium shade with Sevron Blue 5G, Celliton Fast Red GGA Ex. Conc. and Maxilon Red BL without the use of a carrier.

EXAMPLE IX

A mixture of 30 grams of dimethyl tetrephthalate, 1.125 grams of methyl 2-(sodiumsulfo)fluorene-9-hexanoate, 3.26 grams of a 70 percent by weight solution of 1,4-cyclohexanedimethanol in methanol, 23.5 grams of ethylene glycol, and 0.014 gram of zinc acetate was charged to a reactor and heated at a temperature of from 180° C. to 187° C. for a period of 2.5 hours to bring about an ester exchange, while distilling the methanol formed during the reaction. The reaction mixture was then heated at a temperature of from 230° C. to 231° C. for a period of 1 hour to remove the glycol excess. Thereafter, the temperature of the reaction mixture was maintained in the range of from 270° C. to 273° C. for a period of 7.5 hours to carry out a polycondensation. During the reaction, a vigorous stream of nitrogen was passed through the reaction mixture at atmospheric pressure. A crystalline polyester was thus obtained, having a reduced viscosity of 0.40. Dyeable white fibers melt-spun from this polyester were tough and pliable, and exhibited a cold-draw of between 250 and 300 percent.

The following experiments illustrate the preparation of several of the monofunctional dye-assistants of this invention. Similar procedures can be used to produce the others.

Experiment A

To a 500 milliliter, 4-necked flask equipped with a stirrer, condenser, thermometer, and stopper, there were charged 102 grams of concentrated sulfuric acid. The acid was cooled to a temperature of 10° C., whereupon 51 grams of 9-fluorenepropionic acid were added portionwise thereto, accompanied by stirring and continued cooling, so that the temperature of the resulting mixture was maintained at about 10° C. After stirring for an additional 15 minutes, the mixture was placed in an oil bath having a temperature of 50° C., whereupon the temperature of the mixture rose to 59° C. At this temperature, the solids present in the mixture went into the solution. The solution was heated at a temperature of 50° C. for a period of 2 hours, accompanied by continued stirring, and then poured into 100 milliliters of iced water. A precipitate was formed and was filtered and purified by two recrystallizations from hydrochloric acid. In this manner, 43 grams of a substantially pure 2-sulfofluorene-9-propionic acid product, having a melting point of 185–7° C., were obtained. The sulfofluorene-9-propionic acid product was then introduced to another reaction flask and dissolved in 300 milliliters of methanol. The solution was refluxed for a period of 8 hours, during which time a constant volume of about 300 milliliters was maintained by the addition of methanol. In this manner, a methanol solution of methyl 2-sulfofluorene-9-propionate was obtained. The solution was thereafter cooled to about room temperature and titrated with a methanolic sodium hydroxide soluiton to a pH of 7.2. A precipitate was formed and was filtered and purified by two recrystallizations from methanol. In this manner, 3.6 grams of a substantially pure methyl 2-(sodiumsulfo)fluorene-9-propionate product, having a melting point of 245–8° C., were obtained. In like manner, butyl 2-(potassiumsulfo)fluorene-9-acetate is produced by the sulfonation of 9-fluoreneacetic acid, followed by esterification with butanol and then titration with potassium hydroxide.

Experiment B

To a 500 milliliter 4-necked flask equipped with a stirrer, condenser, thermometer, and dropping funnel, there were charged 51 grams of acetic anhydride. The anhydride was cooled to a temperature of 0° C., whereupon 21.5 grams of sulfuric acid were added dropwise thereto, accompanied by stirring and continued cooling, so that the temperature of the resulting mixture was maintained at about 0° C. To this mixture, there were slowly added 100 milliliters of an ethylene dichloride solution containing 50 grams of 9-fluorenebutyric acid. The addition was effected over a period of 25 minutes, accompanied and followed by continued stirring and cooling, so that the temperature of the resulting mixture was maintained in the range of from 0° C. to 10° C. for a period of 4 hours. The reaction mixture was then heated at a temperature of 40° C. for a period of 3.5 hours, and subsequently cooled to room temperature. In this manner, a solution of 2-sulfofluorene-9-butyric acid was obtained. To this solution, there were added 250 milliliters of methanol. The solution then was refluxed for a period of 6 hours to esterify the acid present, which included the acetic anhydride component of the sulfonating agent. The methyl acetate formed during esterification, together with an ethylene dichloride-methanol azeotrope, was removed as a distillate during the reflux period, and replaced with fresh methanol to maintain a constant volume of about 400 milliliters. In this manner, a methanol solution of methyl 2-sulfonfluorene-9-butyrate was obtained. The solution was thereafter cooled to about room termperature, treated with activated charcoal, and titrated with a methanolic sodium hydroxide solution to a pH of 7.1. A precipitate was formed and was filtered and purified by recrystallization, once from acetic acid and twice from methanol. In this manner, 26 grams of a substantially pure methyl 2-(sodiumsulfo)fluorene-9-butyrate product were obtained. Analysis.—Calculate for $C_{18}H_{17}O_5SNa \cdot H_2O$: C, 55.94; H, 4.96. Found: C, 55.90; H. 5.07. In like manner, ethyl 2-(lithiumsulfo)fluorene-9-butyrate is produced by the sulfonation of 9-fluorene-butyric acid, followed by esterification with ethanol and then titration with lithium hydroxide.

Exeperiment C

To a 500 milliliter, round-bottomed 3-necked flask equipped with a stirrer, thermometer, and dropping funnel, there were charged 44.92 grams of acetic anhydride. The anhydride was cooled to a temperature of $-5°$ C., whereupon 22.0 grams of sulfuric acid were added portion-wise thereto, accompanied by stirring and continued cooling, so that the temperature of the resulting mixture was maintained at about 0° C. To this mixture, there were slowly added 100 milliliters of an ethylene dichloride solution containing 59.88 grams of methyl 9-fluorenehexanoate. The addition was effected over a period of 25 minutes, accompanied by continued stirring and cooling, so that the temperature of the resulting mixture was maintained at about 0° C. The reaction mixture was then heated at a temperature in the range of from 40° C. to 43° C. for a period of 2.5 hours. The mixture was cooled to room temperature and allowed to stand overnight. The reaction mixture was then distilled under reduce pressure at a kettle temperature in the range of from 35° C. to 45° C. until all of the ethylene dichloride was removed. To the residue, there were added 150 milliliters of methanol, accompanied by cooling, so as to maintain a temperature in the range of from 25° C. to 35° C. Methyl acetate, formed by the esterification of the acetic anhydride component of the sulfonating agent, and excess methanol was then distilled off on a steam bath, leaving behind methyl 2-sulfofluorene-9-hexanoate as a residue product. The methyl 2-sulfofluorene-9-hexanoate residue was then dissolved in 550 milliliters of methanol and titrated with 80 grams of a 10 percent methanolic sodium hydroxide solution to a pH of approximately 7.0. The resulting mixture was heated to a temperature of 60° C. to dissolve the product, filtered and allowed to crystallize. The crystalline precipitate was collected, washed with isopropyl ether and air-dried on a Buchner funnel. The product, weighing 53.5 grams was purified by recrystallization from methanol and from a 2:1 methanol-isopropanol mixture. Finally, the product was extracted with acetonitrile at a temperature of 60° C. and air-dried on a Buchner funnel, and then in a vacuum dessicator, for a period of 49 hours. In this manner, a substantially pure methyl 2-(sodiumsulfo)fluorene-9-hexanoate product was obtained. Analysis.—Calculated for $C_{20}H_{21}O_5SNa \cdot H_2O$: C, 58.0; H, 5.59. Found: C, 57.4; H, 5.8. In like manner, methyl 2-(potassiumsulfo)fluorene-9-octanoate is produced by the sulfonation of methyl 9-fluoreneoctanoate, followed by titration with potassium hydroxide.

What is claimed is:

1. A dyeable linear polyester consisting essentially of the condensation product of (a) a dicarboxylic acid compound selected from the group consisting of the monocyclic aromatic dicarboxylic acids and the dialkyl esters thereof; (b) an aliphatic glycol containing from 2 to 10 carbon atoms; and, based upon the total amount of said dicarboxylic acid compound, (c) from about 0.1 to about 3.5 mole percent of a compound of the formula:

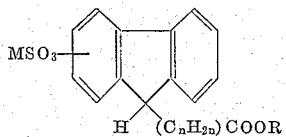

wherein M is an alkali metal, n is an integer of from 1 to 12, and R is selected from the group consisting of hydrogen and alkyl.

2. A dyeable linear polyester consisting essentially of the condensation product of (a) dimethyl terephthalate; (b) a compound of the formula:

HO(CH$_2$)$_m$OH wherein m is an integer of from 2 to 10; and, based upon the total amount of said dimethyl terephthalate, (c) from about 0.1 to about 3.5 mole percent of a compound of the formula:

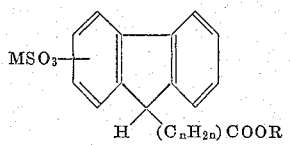

wherein M is an alkali metal having an atomic number of from 3 to 19, n is an integer of from 2 to 8, and R is methyl.

3. A dyeable linear polyester consisting essentially of the condensation product of (a) dimethyl terephthalate; (b) ethylene glycol; and, based upon the total amount of said dimethyl terephthalate, (c) from about 0.1 to about 3.5 mole percent of a compound of the formula:

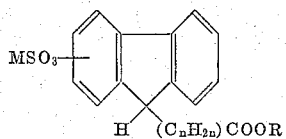

wherein M is an alkali metal having an atomic number of from 3 to 19, n is an integer of from 2 to 8, and R is methyl.

4. A dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 2-(sodiumsulfo)fluorene-9-propionate.

5. A dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 2-(sodiumsulfo)fluorene-9-butyrate.

6. A dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 2-(sodiumsulfo)fluorene-9-hexanoate.

7. A dyeable linear polyester consisting essentially of the condensation product of (a) dimethyl terephthalate; (b) 1,4-cyclohexanedimethanol; and, based upon the total amount of said dimethyl terephthalate, (c) from about 0.1 to about 3.5 mole percent of a compound of the formula:

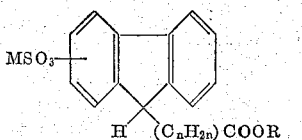

wherein M is an alkali metal having an atomic number of from 3 to 19, n is an integer of from 2 to 8, and R is methyl.

8. A dyeable linear polyester consisting essentially of the condensation product of (a) dimethyl terephthalate; (b) 1,4-cyclohexanedimethanol; and, based upon the total amount of said dimethyl terephthalate, (c) from about 0.15 to about 2.5 mole percent of methyl 2-(sodiumsulfo)-fluorene-9-hexanoate.

9. A dyeable linear polyester consisting of (a) a mixture of dicarboxylic acid compounds consisting of from about 90 to about 99.9 mole percent of dimethyl terephthalate and from about 0.1 to about 10 mole percent of dimethyl isophthalate; (b) ethylene glycol; and, based upon the total amount of said mixture of dicarboxylic acid compounds, (c) from about 0.15 to about 2.5 mole percent of methyl-2-(sodiumsulfo)fluorene-9-butyrate.

10. A dyeable linear polymer consisting of (a) a mixture of dicarboxylic acid compounds consisting of from about 90 to about 99.9 mole percent of dimethyl terephthalate and from about 0.1 to about 10 mole percent of dimethyl-2-(postassiumsulfo)fluorene - 9,9-dipropionate; (b) ethylene glycol; and, based upon the total amount of said mixture of dicarboxylic acid compounds, (c) from about 0.15 to about 2.5 mole percent of methyl 2-(sodiumsulfo)fluorene-9-hexanoate.

11. A dyeable linear polyester consisting of (a) a mixture of dicarboxylic acid compounds consisting of from about 90 to about 99.9 mole percent of dimethyl terephthalate and from about 0.1 to about 10 mole percent of dimethyl sebacate; (b) ethylene glycol; and, based upon the total amount of said mixture of dicarboxylic acid compounds, (c) from about 0.15 to about 2.5 mole percent of methyl-2-(sodiumsulfo)fluorene-9-hexanoate.

12. A heat-stretched, dyeable textile article composed of a dyeable linear polyester consisting essentially of the condensation product of (a) a dicarboxylic acid compound selected from the group consisting of the monocyclic aromatic dicarboxylic acids and the dialkyl esters thereof; (b) an aliphatic glycol containing from 2 to 10 carbon atoms; and, based upon the total amount of said dicarboxylic acid compound, (c) from about 0.1 to about 3.5 mole percent of a compound of the formula:

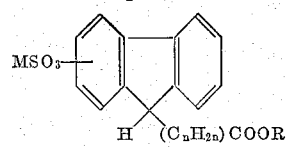

wherein M is an alkali metal, n is an integer of from 1 to 12, and R is selected from the group consisting of hydrogen and alkyl.

13. A heat-stretched, dyeable textile article composed of a dyeable linear polyester consisting essentially of the condensation product of (a) methyl terephthalate; (b) a compound of the formula:

HO(CH$_2$)$_m$OH wherein m is an integer of from 2 to 10; and, based upon the total amount of said dimethyl terephthalate, (c) from about 0.1 to about 3.5 mole percent of a compound of the formula:

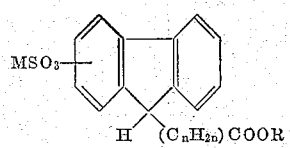

wherein M is an alkali metal having an atomic number of from 3 to 19, n is an integer of from 2 to 8, and R is methyl.

14. A heat-stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.1 to about 3.5 mole percent of a compound of the formula:

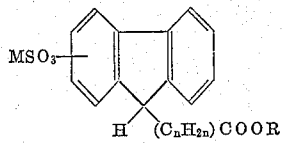

wherein M is an alkali metal having an atomic number of from 3 to 19, n is an integer of from 2 to 8, and R is methyl.

15. A heat-stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 2-(sodiumsulfo)fluorene-9-hexanoate.

16. A heat-stretched, dyeable textile article composed of a dyeable linear polyester consisting essentially of the condensation product of (a) dimethyl terephthalate; (b) 1,4-cyclohexanedimethanol; and, based upon the total amount of said dimethyl terephthalate, (c) from about 0.1 to about 3.5 mole percent of a compound of the formula:

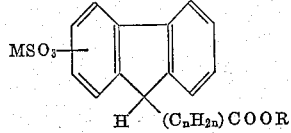

wherein M is an alkali metal having an atomic number of from 3 to 19, n is an integer of from 2 to 8, and R is methyl.

17. A heat-stretched, dyeable textile article composed of a dyeable linear polyester consisting essentially of the condensation product of (a) dimethyl terephthalate; (b) 1,4-cyclohexanedimethanol; and, based upon the total amount of said dimethyl terephthalate, (c) from about 0.15 to about 2.5 mole percent of methyl 2-(sodiumsulfo)fluorene-9-hexanoate.

18. A heat-stretched, dyeable textile article composed of a dyeable linear polyester consisting of (a) a mixture of discarboxylic acid compounds consisting of from about 90 to about 99.9 mole percent of dimethyl terephthalate and from about 0.1 to about 10 mole percent of dimethyl isophthalate; (b) ethylene glycol; and, based upon the total amount of said mixture of dicarboxylic acid compounds, (c) from about 0.15 to about 2.5 mole percent of methyl 2-(sodiumsulfo)fluorene-9-butyrate.

19. A heat-stretched, dyeable textile article composed of a dyeable linear polyester consisting of (a) a mixture of dicarboxylic acid compounds consisting of from about 90 to about 99.9 mole percent of dimethyl terephthalate and from about 0.1 to about 10 mole percent of dimethyl sebacate; (b) ethylene glycol; and, based upon the total amount of said mixture of dicarboxylic acid compounds, (c) from about 0.15 to about 2.5 mole percent of methyl 2-(sodiumsulfo)fluorene-9-hexanoate.

References Cited in the file of this patent
UNITED STATES PATENTS

| 2,901,466 | Kibler et al. | Aug. 25, 1959 |
| 3,018,272 | Griffing et al. | Jan. 23, 1962 |

FOREIGN PATENTS

| 549,179 | Belgium | Oct. 15, 1956 |